Patented Nov. 16, 1926.

1,607,326

UNITED STATES PATENT OFFICE.

FRANK S. WASHBURN, OF RYE, NEW YORK.

PROCESS OF PRODUCING THIOUREA.

No Drawing.   Application filed June 5, 1920.   Serial No. 386,708.

This invention relates to a process for producing thiourea from lime nitrogen or crude calcium cyanamide, and has for its object to improve the methods heretofore proposed. With this and other objects in view the invention consists in the novel steps and combination of steps constituting the process all as will be more fully hereinafter disclosed and particularly pointed out in the claims.

Thiourea has heretofore been a more or less laboratory curiosity selling at an extremely high price. This is due to the fact that it was formerly almost universally obtained by heating ammonium sulphocyanate. The dry salt was heretofore heated to above 150° C. but the maximum transformation from thiocyanate to thiourea at equilibrium has only been about 25%. Ammonium thiocyanate is itself an expensive reagent and thiourea has, therefore, always been a costly material It has been also reported that thiourea can be obtained from cyanamide $H_2CN_2$ through the action of hydrogen sulphide in the presence of a little ammonia. I have tried this process of manufacture, however, and believe it to be only of a laboratory interest for it produces merely traces of thiourea. The time required even for the production of said traces of thiourea by this prior method is so very long as to render the process hopeless of commercial development. The process which I here disclose, on the other hand, starts with a very cheap and plentiful reagent or base material, and operates at a high efficiency. In order that my precise invention may be more clearly understood it may be described as follows:—

I first prepare a solution of crude calcium cyanamide by treating lime nitrogen with cold water To prevent any considerable decomposition of the crude calcium cyanamide, I prefer to keep the temperature of the solution say below 20° C. After letting this solution stand for a few hours, I remove the insoluble material by filtration, during which operation I preferably maintain the temperature below say 20° C. or that temperature at which any substantial decomposition of the cyanamide would take place. This filtration removes the bulk of the lime in the lime nitrogen. I then precipitate the calcium salts from this cold solution by the addition of a slight excess of dilute sulphuric acid. After the precipitation of said salts, I preferably exactly neutralize the remaining solution with an excess of calcium carbonate in the form of chalk, marble, or in any other suitable form I now remove, preferably by filtration, the insoluble materials consisting of calcium sulphate and carbonate I may next prepare a solution of ammonium sulphide by saturating aqua ammonia with hydrogen sulphide gas. I add to this solution of ammonium sulphide, a quantity of elemental sulphur equivalent to approximately 10% of the chemically combined, or sulphide sulphur present in the ammonium sulphide.

The clear filtrate made as described above is now thoroughly agitated, and a small test portion thereof is taken out, and treated with a similar small portion of the above mentioned ammonium sulphide solution. This treatment is carried out for say fifteen minutes at a temperature of say between 95° C. and 100° C. The reaction which takes place between these two temperatures may be expressed by the equation

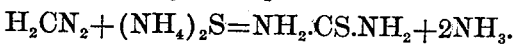
$$H_2CN_2 + (NH_4)_2S = NH_2 \cdot CS \cdot NH_2 + 2NH_3.$$

If an insufficient quantity of ammonium sulphide has been added to completely unite with all the cyanamide present, the resulting solution will be white and milky, due to the presence of elemental sulphur. If a sufficient quantity of ammonium sulphide, on the other hand, has been added, the solution remains clear and yellow after about fifteen minutes standing at the above temperature of from 95° C. to 100° C., under the pressures developed.

In this way I may arrive at exactly the necessary amount of the ammonium sulphide solution necessary to completely react with the cyanamid nitrogen in the above mentioned filtrate. Based upon the knowledge of this test I may now add sufficient of the above named ammonium sulphide solution to the said filtrate to convert all the cyanamid nitrogen in said filtrate into thiourea and allow the mixture to stand for a suitable length of time at from say 15° C. to 25° C. or until the conversion is complete. After said digestion I next evaporate the solution until after all the remaining ammonium sulphide has been decomposed, its yellow color has disappeared and the dissolved sulphur has separated out. I then filter the solution of the precipitated sulphur thus obtained and evaporate and crystallize out the thiourea thus formed. The crystals obtained by this simple method, from even such a crude and impure material as the ordinary lime nitrogen of commerce are found to be above 99% purity.

In carrying out this work I found that the mere treatment of the solution with ordinary ammonium sulphide $(NH_4)_2S$ was not satisfactory. At ordinary temperatures the ordinary ammonium sulphide solution will not react on the lime nitrogen extract containing $H_2CN_2$, to produce the thiourea, under say twenty four to thirty six hours, and even then one is not certain of a complete transformation. At higher temperatures this transformation is more rapid, but is still very slow and of doubtful completeness.

I have learned, however, that by the addition of a slight amount of sulphur to the ammonium sulphide, in the manner above mentioned, this sulphur acts as a catalyst and causes the reaction to take place with a substantial completion and with a very great rapidity. For instance at 20° C. using colorless ammonium sulphide, a practically complete reaction was obtained only after forty hours treatment. When I use, on the other hand, the yellow ammonium sulphide containing 10 per cent added sulphur to each 100 per cent of the combined or sulphide sulphur, the reaction is very complete in about three hours treatment. At 60° C. with the yellow sulphur containing solution, the reaction is complete in about fifteen minutes.

The sulphur it is found does not enter into the reaction in any way and acts as a pure catalyst.

Since the extracts of lime nitrogen are liable to decomposition at temperatures above 15° C. to 25° C., it is preferable to work at lower temperatures, and there is, therefore, a very great advantage in the use of an accelerator to hasten this reaction at the preferably low temperatures at which one should operate.

It is self evident that in preparing the lime nitrogen extract, I can use any means of precipitating soluble salts, as for instance, I can replace the sulphuric acid by carbonic acid or by any other suitable precipitant.

It will now be clear that the following advantages flow from the foregoing procedure:—

(a) I am enabled to employ a crude and cheap material such as lime nitrogen and to produce therefrom by an inexpensive method, a substantially pure thiourea;

(b) I attain these results in a less time and in a more expeditious manner than has been heretofore possible; and (c) Even though a crude base material is employed, the efficiency of the process is higher than in the other methods.

It is obvious that those skilled in the art may vary the procedure as outlined above without departing from the spirit of my invention, and I therefore do not wish to be limited to this disclosure except as may be required by the claims.

What I claim is:

1. The process of producing thiourea from crude calcium cyanamid which consists in dissolving said cyanamid in water; maintaining the temperature of the solution at a point sufficiently low to prevent a substantial decomposition of the cyanamid present; removing the insoluble impurities present; and reacting on the solution thus obtained with a solution containing ammonium sulphide and sulphur in solution, substantially as described.

2. The process of producing thiourea from crude calcium cyanamid which consists in dissolving said cyanamid in water; maintaining the temperature of the solution at a point sufficiently low to prevent a substantial decomposition of the cyanamid present; adding to the solution thus obtained sulphuric acid; removing the insoluble constituents present; neutralizing any excess of sulphuric acid present; and reacting on the solution thus obtained with a solution containing ammonium sulphide and dissolved sulphur, substantially as described.

3. The process of producing thiourea from crude calcium cyanamid which consists in dissolving said cyanamid in water; maintaining the temperature of the solution at a point sufficiently low to prevent a substantial decomposition of the cyanamid present; removing the insoluble impurities present; and reacting on the solution thus obtained with a solution containing yellow ammonium sulphide and dissolved sulphur, substantially as described.

4. The process of producing thiourea consisting in treating lime nitrogen with water to provide a solution containing calcium cyanamid; treating said solution with sulphuric acid to obtain a second solution containing cyanamid $H_2CN_2$; and reacting on said second solution with a third solution containing yellow ammonium sulphide and some sulphur in solution, substantially as described.

5. The process of producing thiourea consisting in extracting lime nitrogen with water; filtering the cold solution; adding to the solution thus obtained sulphuric acid; filtering out the insoluble salts thus produced; neutralizing any excess of sulphuric acid present with calcium carbonates; filtering out any precipitated salts present; and treating the extract thus produced with an ammonium sulphide solution containing dissolved sulphur, substantially as described.

6. The process of producing thiourea consisting in extracting lime nitrogen with water; filtering out any insoluble constituents present; precipitating and removing the calcium present from solution; treating the extract with ammonium sulphide containing ammonium polysulphide to react on the cyanamid present; heating the resulting solution; filtering off the sulphur precipitated; and crystallizing out the thiourea thus produced from the resulting solution, substantially as described.

7. The process of producing thiourea consisting in extracting lime nitrogen with water; removing the insoluble constituents from said solution; removng the combined calcium from said solution; treating the extract with a solution made by acting upon a water solution of ammonia with hydrogen sulphide and dissolving elemental sulphur in the liquid; boiling the solution to separate out a portion of the sulphur present; filtering out the separated sulphur; and recovering the thiourea produced, substantially as described.

8. The process of producing thiourea consisting in extracting lime nitrogen with water; removing the insoluble constituents from said solution; removing the combined calcium from said solution; treating the extract with ammonium sulphide to which has been added free sulphur; heating the solution to separate out a portion of the sulphur present; filtering out the separated sulphur; and recovering the thiourea produced, substantially as described.

9. A process of producing thiourea which comprises providing a water solution of a cyanamid, reacting thereon with a solution of ammonium sulphide containing added sulphur, and recovering the thiourea formed.

10. A process of producing thiourea which comprises providing a water solution of a cyanamid, reacting thereon with a solution of ammonium sulphide containing added sulphur for less than six hours to convert a major portion of the cyanamid into thiourea, and recovering the thiourea formed.

11. A process of producing thiourea which comprises providing a water solution of a cyanamid, reacting thereon with a solution of ammonium sulphide containing added sulphur for less than six hours to cause a substantially complete conversion of the cyanamid into thiourea and recovering the thiourea formed.

12. A process of producing thiourea which comprises providing a water solution of a cyanamid, reacting thereon with a solution of ammonium sulphide containing added sulphur for less than six hours to cause a substantially complete conversion of the cyanamid into thiourea, removing the sulphur and recovering substantially pure thiourea.

13. A process of producing thiourea which comprises providing a water solution of a cyanamid, reacting thereon with a solution of ammonium sulphide containing added sulphur at a temperature of about 60° C. for about fifteen minutes and recovering the thiourea formed.

In testimony whereof I affix my signature.

FRANK S. WASHBURN.